United States Patent
Cholas et al.

(10) Patent No.: US 11,057,758 B2
(45) Date of Patent: Jul. 6, 2021

(54) LOCATION VERIFICATION AND ENFORCEMENT FOR CONTENT ACCESS DEVICES

(71) Applicant: T-Mobile USA, Inc., Bellevue, WA (US)

(72) Inventors: Chris A. Cholas, Denver, CO (US); David M. Fellows, Boston, MA (US); Charles A. Hasek, IV, Denver, CO (US); Jeffrey Binder, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/423,021

(22) Filed: May 26, 2019

(65) Prior Publication Data

US 2020/0374683 A1    Nov. 26, 2020

(51) Int. Cl.
| | |
|---|---|
| *H04W 8/06* | (2009.01) |
| *H04W 4/029* | (2018.01) |
| *H04W 48/16* | (2009.01) |
| *H04W 76/10* | (2018.01) |
| *H04W 12/08* | (2021.01) |
| *H04L 29/06* | (2006.01) |
| *H04L 29/12* | (2006.01) |
| *H04W 4/80* | (2018.01) |
| *H04W 88/16* | (2009.01) |
| *H04L 29/08* | (2006.01) |

(52) U.S. Cl.
CPC ........... *H04W 8/06* (2013.01); *H04L 61/2007* (2013.01); *H04L 63/107* (2013.01); *H04W 4/029* (2018.02); *H04W 12/0804* (2019.01); *H04W 48/16* (2013.01); *H04W 76/10* (2018.02); *H04L 67/12* (2013.01); *H04W 4/80* (2018.02); *H04W 88/16* (2013.01)

(58) Field of Classification Search
CPC ........ H04W 8/06; H04W 4/029; H04W 4/80; H04W 76/10; H04W 12/0804; H04W 48/16; H04W 88/16; H04L 61/2007; H04L 63/107; H04L 67/12
USPC .................................................... 455/435.1
See application file for complete search history.

(56) References Cited

U.S. PATENT DOCUMENTS

| | | | |
|---|---|---|---|
| 8,078,696 B2* | 12/2011 | LaJoie | G06Q 30/0256 709/219 |
| 9,332,385 B1* | 5/2016 | Abraham | H04W 48/04 |
| 10,102,304 B1* | 10/2018 | Muralidharan | G06Q 30/02 |
| 2008/0022003 A1* | 1/2008 | Alve | G01S 5/0009 709/229 |
| 2019/0266640 A1* | 8/2019 | Harlan | G06Q 30/0247 |

* cited by examiner

*Primary Examiner* — Farid Seyedvosoghi
(74) *Attorney, Agent, or Firm* — Brownstein Hyatt Farber Schreck, LLP

(57) ABSTRACT

A system for location verification and enforcement receives an authorization request to access content from a content access device. The authorization request includes and/or is associated with location information obtained from a gateway device via a local area network and determined using multiple communication networks. The location information is compared to a record indicating that the content access device and the gateway device were both present at a location. When the location information matches the record, an authorization is transmitted to the content access device. The content access device may be operative to access the content upon receiving the authorization.

20 Claims, 9 Drawing Sheets

LOCATION VERIFICATION AND ENFORCEMENT FOR CONTENT ACCESS DEVICES

FIELD

The described embodiments relate generally to location verification and enforcement. More particularly, the present embodiments relate to location verification and enforcement for content access devices.

BACKGROUND

Content delivery systems may provide a wide variety of content from a wide variety of content sources to a wide variety of client content access devices over a variety of different wired and/or wireless communication media. For example, content providers may use various content delivery systems to provide television programs and movies and/or other video, music and/or other audio, images, and so on obtained from one or more different content sources. Content delivery systems may linearly provide content (such as by broadcasting the content), provide content on demand, and/or provide access to content in a variety of different ways.

Users may employ a variety of different content access devices to request and/or access content via one or more content delivery systems. Some content access devices may be configured to access content via a fixed communication medium, such as set top boxes in a coaxial cable television network. Other content access devices may be configured to access content via a variety of different communication media, such as various user-controlled computing devices that may access television, movies, and/or other content via one or more different internet service providers.

SUMMARY

The present disclosure relates to location verification and enforcement. An authorization request to access content is received from a content access device that includes location information obtained from a gateway device via a local area network and determined using multiple communication networks. The location information is compared to a record indicating that the content access device and the gateway device were both present at a location. When the location information matches the record, an authorization is transmitted to the content access device.

In various embodiments, a method for location verification and enforcement includes receiving an authorization request to access content from a content access device, the authorization request including location information received by the content access device from a gateway device that is connected to the content access device by a local area network, the location information determined by the gateway device using multiple communication networks; comparing the location information to a record for the content access device indicating that the content access device and the gateway device were both present at a location; and when the location information matches the record, transmitting an authorization to the content access device.

In some examples, the method further includes creating the record using data received from a registration device that communicates with the content access device and the gateway device and storing the record. In a number of examples of such implementations, the data received from the registration device includes first internet protocol location information received from the gateway device, second internet protocol location information received from the content access device, third internet protocol location information of the registration device, first cellular network location information received from the gateway device, and second cellular network location information of the registration device. In some such examples, the method further includes determining a match between the first internet protocol location information, the second internet protocol location information, the third internet protocol location information the first cellular network location information, and the second cellular network location information.

In various examples, the method further includes creating the record using received data indicating first internet protocol location information of the gateway device, second internet protocol location information of the content access device, and cellular network location information of the gateway device; determining a match between the first internet protocol location information, the second internet protocol location information, and the cellular network location information; and storing the record. In some implementations of such examples, the location information includes a current internet protocol location of the gateway device and a current cellular network location of the gateway device. In a number of such examples, the method further includes matching the location information to the record by matching the first internet protocol location to the current internet protocol location and the cellular network location information to the current cellular network location.

In some embodiments, a content access device includes a non-transitory storage medium that stores instructions and a processing unit. The processing unit executes the instructions to determine to access content; obtain location information from a gateway device on a local area network, the location information determined by the gateway device using multiple communication networks; transmit an authorization request to access content to a location verification system, the authorization request including the location information; when the location information matches a record for the content access device stored by the location verification system indicating that the content access device and the gateway device were both present at a location, receive an authorization from the location verification system; and access the content.

In various examples, the processing unit determines internet protocol location information for the content access device. In some examples, the processing unit provides the internet protocol location information for the content access device with the authorization request.

In a number of examples, the processing unit participates in a registration process to create the record where the internet protocol location information for the content access device is provided to the location verification system along with gateway device internet protocol location information and gateway device cellular network location information. In some implementations of such examples, the processing unit participates in the registration process by providing the internet protocol location to a registration device that communicates with the location verification system.

In various examples, the processing unit provides a content access account identifier with the authorization request. In some implementations of such examples, the record includes the content access account identifier.

In a number of embodiments, a gateway device for location verification and enforcement includes a first communication unit, a second communication unit, a non-transitory storage medium that stores instructions, and a processing unit. The processing unit executes the instructions to determine location information for the gateway device using multiple communication networks, the first communication unit, and the second communication unit; and participate in a registration process to create a record with a location verification system by providing the location information, the record indicating the gateway device and a content access device are connected by a local area network and are present in a location.

In some examples, the processing unit receives a request for a current location of the gateway device from the content access device as part of the content access device requesting to access content; determines the current location using the multiple communication networks, the first communication unit, and the second communication unit; and provides the current location to the content access device. In various examples, the processing unit participates in the registration process by providing the location information to a registration device that communicates with the location verification system and the content access device. In a number of implementations of such examples, the processing unit communicates with the registration device using Bluetooth, Bluetooth low energy, or near-field communication.

In various examples, the location information includes at least two of internet protocol location information for the gateway device, cellular network location information for the gateway device, and global positioning system location information for the gateway device. In a number of examples, the first communication unit is a Narrowband Internet of Things communication unit.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
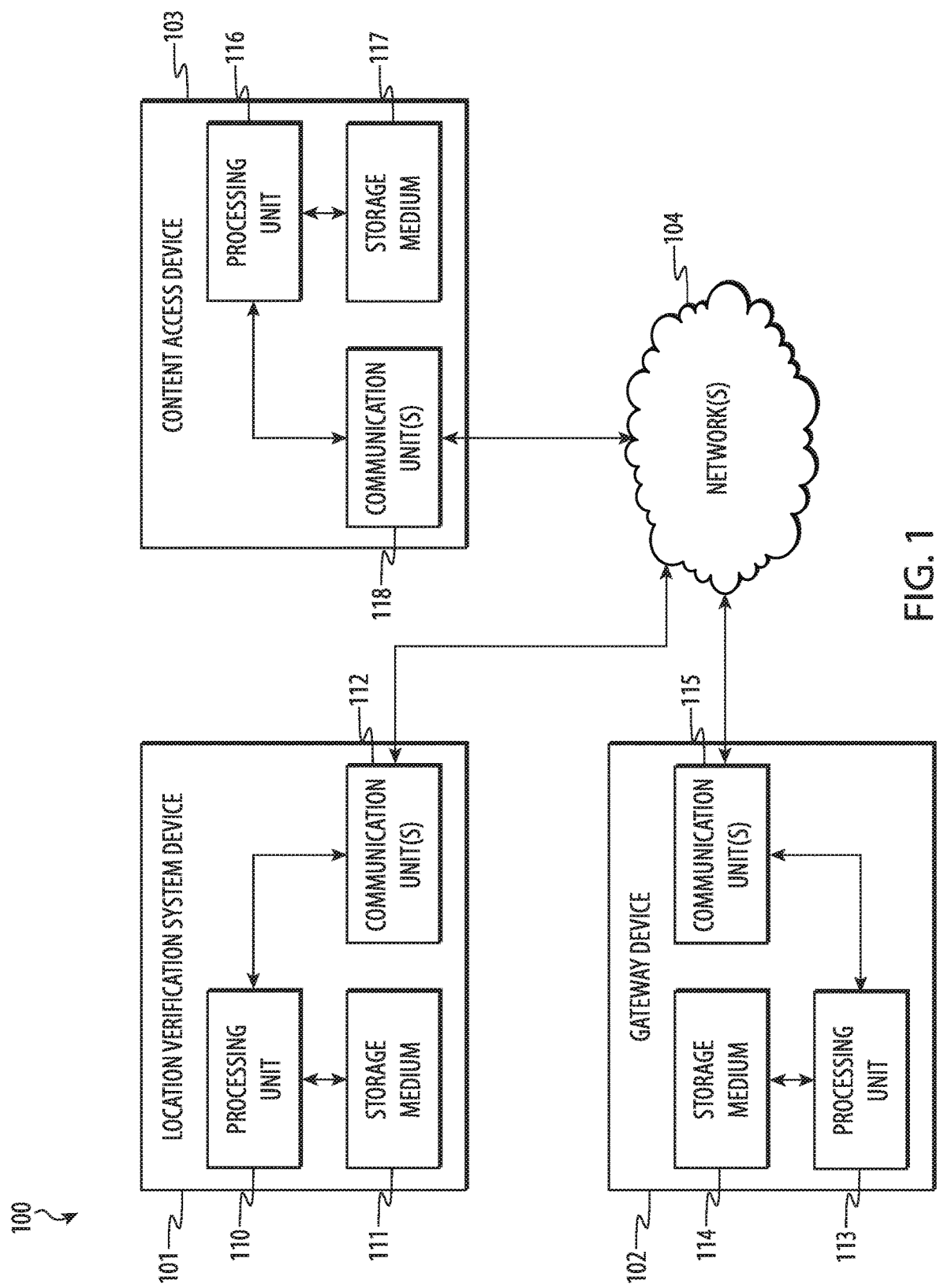
FIG. 1 depicts a first example system for location verification and enforcement.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

Content providers may be restricted by contract, governmental regulation, and/or other obligation to verify locations of content access devices to which the content providers provide content and/or enforce various policies related to those determined locations. For example, governmental regulations may require content providers to verify content access device location for emergency alert system services. By way of another example, content providers may contract for the rights to use content delivery systems to provide different content to content access devices in different areas (such as different countries, states, cities and/or other municipalities, addresses, and so on). These rights may cost less than rights to provide content to content access devices located anywhere. Further, some content may be prohibited in some areas. As such, content providers may be obligated to verify and enforce content access device location to ensure that they do not violate the contracted rights when providing content. By way of another example, providers may contract to insert certain advertisements in content delivered to certain areas while inserting other advertisements in content delivered in other areas. Advertisers may not be willing to pay as much for advertising that is not provided to content access devices in targeted locations. As such, content providers may be obligated to verify and enforce content access device location to ensure that advertising is provided to the contracted locations.

Content access device location verification and enforcement may be less complex for content providers who use content delivery systems to deliver content via fixed communication media, such as content delivery systems that provide content to set top boxes in a coaxial cable television network. In this situation, the content provider may know the area to which they are providing content as they are aware of the location in which the communication medium was installed and the communication media does not move.

However, content access device location verification and enforcement may be more complex for content providers who use content delivery systems to deliver content via a variety of different communication media, such as content delivery systems that provide linear and/or on demand content (such as television, movies, and/or other content) to various user-controlled computing devices via one or more different internet service providers. One example of such a system is Internet TV, a term that refers to systems that provide television shows and TV programming via the Internet. In this situation, content access devices may be located almost anywhere in the world and the content provider may not be aware where the content access device accesses the Internet from.

In some such situations, the content provider may query the content access device for its location and/or otherwise obtain the content access device's location from the content access device. However, this kind of location enforcement may be misleading, particularly as content access devices may be configured to "spoof," or falsely report, their location.

To overcome these kinds of issues, systems may be configured so that content access devices use a local area network to communicate with a gateway device that has a trusted location determined using multiple communication networks (such as using internet protocol location information obtained by the gateway device via an internet, cellular location information obtained via a cellular network, global positioning information obtained via a global positioning system, and so on). The presence of a content access device at a location on the local area network with the gateway may be recorded with the content provider, establishing a trusted location for the content access device. The content access device may then communicate with the gateway device specified in the record via the local area network when accessing content from the content provider, establishing that the content access device is still at the trusted location as the content access device would be unable to communicate with the gateway device otherwise. Locations verified in this manner may be highly difficult to spoof and thus may allow the content provider to verify the location of the content access device to a high degree of certainty and enforce various content policies accordingly.

In this way, the system may be able to perform location verification and/or enforcement functions (and/or other functions that depend thereon) that the system would not previously have been able to perform absent the technology disclosed herein. This may enable the system to operate more efficiently while consuming fewer hardware and/or software resources as more resource consuming location verification enforcement techniques could be omitted. Further, fixed communication networks and/or other components could be omitted while still enabling location verification and/or enforcement, reducing unnecessary hardware and/or software components and providing greater system flexibility.

The following disclosure relates to location verification and enforcement. An authorization request to access content is received from a content access device that includes location information obtained from a gateway device via a local area network and determined using multiple communication networks. The location information is compared to a record indicating that the content access device and the gateway device were both present at a location. When the location information matches the record, an authorization is transmitted to the content access device.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 depicts a first example system 100 for location verification and enforcement. The system 100 may enable a content provider to verify a location of one or more content access devices 103 and enforce various content and/or other policies based on the verified location, such as for providing content via a content delivery system. The system 100 may include one or more location verification system devices 101, gateway devices 102, and content access devices 103 that are operable to communicate with one or more of each other via one or more communication networks 104.

The location verification system device 101 may receive an authorization request to access content from the content access device 103 via the network 104. The authorization request may include location information received by the content access device 103 from the gateway device 102, which may be connected to the content access device 103 by a local area network 104. The location information may be determined by the gateway device 102 using multiple communication networks 104. The location verification system device 101 may compare the location information to a record for the content access device 103 indicating that the content access device 103 and the gateway device 102 were both present at a location (such as an address corresponding to the local area network 104). When the location information matches the record, the location verification system device 101 may transmit an authorization to the content access device 103. The authorization may enable the content access device 103 to access the content.

The content access device 103 may determine to access content, obtain location information from the gateway device 102 (determined by the gateway device 102 using multiple communication networks) via the local area network 104, and transmit an authorization request to access content that includes the location information to the location verification system device 101. When the location information matches a record for the content access device 103 stored by the location verification system device 101 indicating that the content access device 103 and the gateway device 102 were both present at a location, the content access device 103 may receive an authorization from the location verification system device 101 and may access the content.

The gateway device 102 may determine location information for the gateway device 102 using multiple communication networks 104. The gateway device 102 may then participate in a registration process to create a record with the location verification system device 101 by providing the location information. The record may indicate the gateway device 102 and the content access device 103 are connected by a local area network 104 and are present in a location. For example, the local area network 104 may be a WiFi network 104. Connection of two devices to a WiFi network 104, given the typical range of approximately 300 feet of WiFi (absent extenders or repeaters) from an access point, may indicate that the devices are both present at a location within approximately 300 feet of an access point of the WiFi network 104.

Locations verified in this manner may be highly difficult to spoof. This may allow a content provider associated with the location verification system device 101 to verify the location of the content access device 103 to a high degree of certainty and enforce various content policies accordingly. In this way, the system 100 may be able to perform location verification and/or enforcement functions (and/or other functions that depend thereon) that the system 100 would not previously have been able to perform. This may enable the system 100 to operate more efficiently while consuming fewer hardware and/or software resources as more resource consuming location verification enforcement techniques could be omitted. Further, fixed communication connections and/or other components could be omitted while still enabling location verification and/or enforcement, reducing unnecessary hardware and/or software components and providing greater system flexibility.

The content access device 103 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, set top boxes, digital media players, and so on. The content access device 103 may include one or more processing units 116 and/or other processors and/or controllers, one or more non-transitory storage media 117 (which may take the form of, but is not limited to, a magnetic storage medium; optical storage medium; magneto-optical storage medium; read only memory; random access memory; erasable programmable memory; flash memory; and so on), one or more communication units 118, and/or other components. The processing unit 116 may execute instructions stored in the non-transitory storage medium 117 to perform various functions. Such functions may include accessing content, requesting content, rendering content, communicating with the gateway device 102 and/or the location verification system device 101 via the network 104 using the communication unit 118, and so on.

Similarly, the gateway device 102 may be any kind of electronic device. The gateway device 102 may include one or more processing units 113 and/or other processors and/or controllers, one or more non-transitory storage media 114 (which may take the form of, but is not limited to, a magnetic storage medium; optical storage medium; magneto-optical storage medium; read only memory; random access memory; erasable programmable memory; flash memory; and so on), one or more communication units 115 (such as an Ethernet communication unit 115 and/or other communication unit 115 operative to communicate with an internet and/or obtain internet protocol location information, a cellular communication unit 115 operative to communicate with a cellular network 104 and/or obtain cellular location information, a global positioning system communication unit 115 operative to communicate with a global positioning system and/or obtain global positioning system location information, a Bluetooth communication unit 115, a Bluetooth Low Energy ("BluetoothLE") communication unit 115, a near-field communication unit 115, and so on), and/or other components. The processing unit 113 may execute instructions stored in the non-transitory storage medium 114 to perform various functions. Such functions may include obtaining location information, providing location information, communicating with the content access device 103 and/or the location verification system device 101 via the network 104 using the communication unit 115, and so on.

Likewise, the location verification system device 101 may be any kind of electronic device. The location verification system device 101 may include one or more processing units 110 and/or other processors and/or controllers, one or more non-transitory storage media 111 (which may take the form of, but is not limited to, a magnetic storage medium; optical storage medium; magneto-optical storage medium; read only memory; random access memory; erasable programmable memory; flash memory; and so on), one or more communication units 112, and/or other components. The processing unit 110 may execute instructions stored in the non-transitory storage medium 111 to perform various functions. Such functions may include receiving authorization requests, transmitting authorizations, providing content, enabling access to content, receiving location information, creating records related to location information, verifying and/or enforcing locations, communicating with the gateway device 102 and/or the content access device 103 via the network 104 using the communication unit 112, and so on.

Although the system 100 is illustrated and described as including particular components arranged in a particular configuration, it is understood that this is an example. In a number of implementations, various configurations of various components may be used without departing from the scope of the present disclosure.

For example, the system 100 is illustrated and described as including the location verification system device 101, the gateway device 102, and the content access device 103. However, it is understood that this is an example. In various implementations, the system 100 may include one or more other devices. By way of illustration, in some implementations, the system 100 may include a registration device that communicates with the location verification system device 101, the gateway device 102, and/or the content access device 103 to perform a registration process that creates a record for the content access device 103 at the location verification system device 101 indicating that the content access device 103 and the gateway device 102 were both present at a location. Various configurations are possible and contemplated without departing from the scope of the present disclosure.

By way of another example, the system 100 is illustrated and described as using as few as one network 104. However, it is understood that this is an example. In other implementations, multiple networks 104 may be used. For example, the gateway device 102 may obtain location information from multiple networks 104 (such as internet protocol location information using an internet network 104, cellular location information using a cellular network 104, global positioning system information using a global positioning system network 104, and so on). Various configurations are possible and contemplated without departing from the scope of the present disclosure.

Additionally, the above illustrates and describes the content access device 103 being able to access content when an authorization is received from the location verification system device 101 and being unable to access content if the authorization is not received. However, it is understood that this is an example. Other configurations are possible and contemplated without departing from the scope of the present disclosure.

For example, in various implementations, location may be verified for premium content but not standard content. As such, standard content may be accessible without receiving an authorization but an authorization may need to be received before premium content can be accessed. By way of another example, location specific content may be accessible only upon receipt of an authorization and content available anywhere (such as mobile content) may be accessed instead if an authorization is not received. In still other examples, the content access device 103 may be mobile and may access location specific content when the location specific device is verified as currently present at a registered location and mobile content when the content access device 103 is at any other location other than the registered location. Various configurations are possible and contemplated without departing from the scope of the present disclosure.

Figure 2:
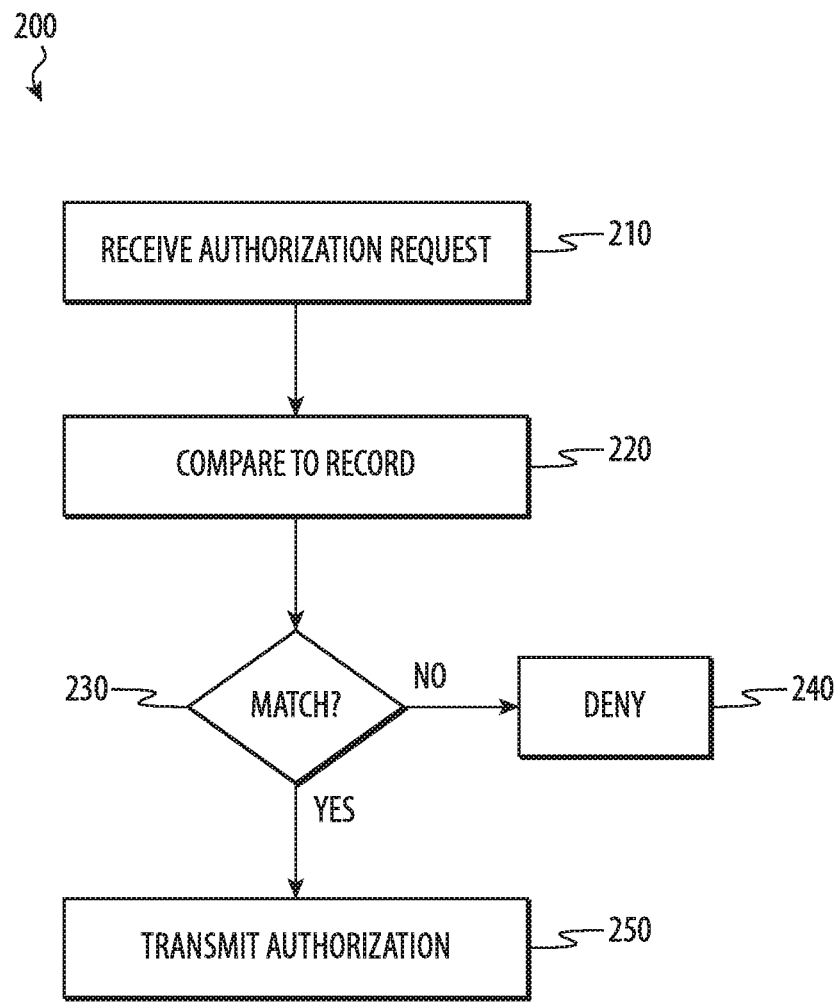
FIG. 2 depicts a flow chart illustrating a first example method for location verification and enforcement. This method may be performed by the system of FIG. 1.

FIG. 2 depicts a flow chart illustrating a first example method 200 for location verification and enforcement. This method 200 may be performed by the system 100 of FIG. 1.

At operation 210, an electronic device (such as the location verification system device 101 of FIG. 1) may receive an authorization request to access content. The electronic device may receive the authorization request from a content access device, such as the content access device 103 of FIG. 1. The authorization request may include and/or otherwise be associated with location information. The location information may be received by the content access device from a gateway device (such as the gateway device 102 of FIG. 1), which may be connected to the content access device by a WiFi and/or other local area network. The location information may be determined by the gateway device using multiple communication networks.

At operation 220, the electronic device may compare the location information to a record. The location information may specify a location for the content access device and/or the gateway device. The record may indicate that the content access device and the gateway were both present at the location when the record was created.

The flow may proceed to operation 230 where the electronic device determines whether or not the location information matches the record. If so, the flow may proceed to operation 250 where the electronic device may transmit an authorization directly and/or indirectly to the content access device. This may enable the content access device to access the content. Otherwise, the flow may proceed to operation 240 where the electronic device may deny and/or otherwise not respond to the authorization request.

In various examples, this example method 200 may be implemented as a group of interrelated software modules or components that perform various functions discussed herein. These software modules or components may be executed within a cloud network and/or by one or more computing devices, such as the location verification system device 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, operation 230 is illustrated and described as matching the location information to the record. However, it is understood that this is an example. In some implementations, the location information may not match the record precisely. However, the authorization may still be transmitted as long as the location information is within a range of a previous location indicated in the record (such as 100 feet, 1 mile, and so on). This may account for minor variations that may occur in determining location information, such as how global positioning system location information determined using a global positioning system may vary over time even when movement does not occur.

Figure 3:
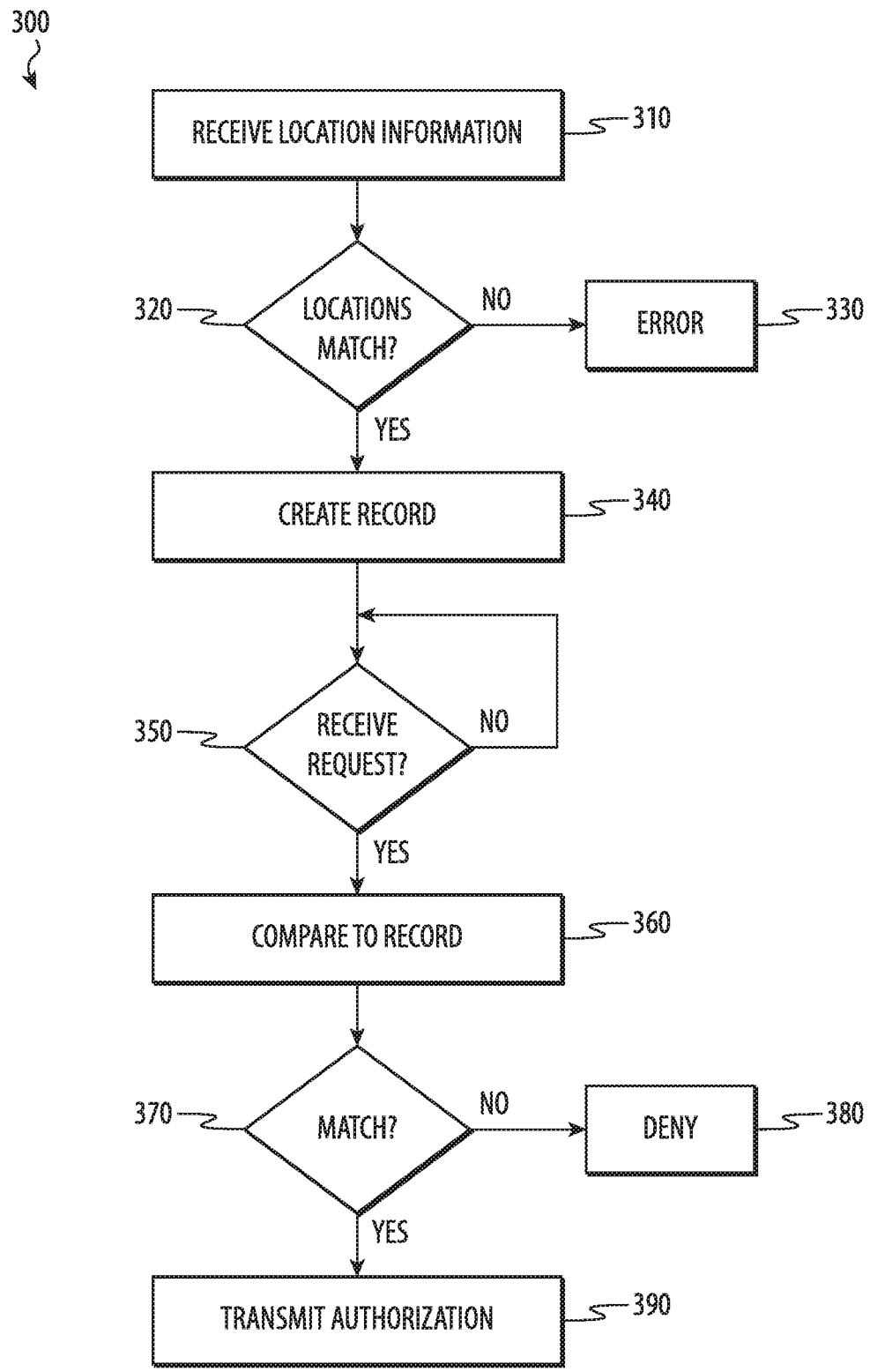
FIG. 3 depicts a flow chart illustrating a second example method for location verification and enforcement. This method may be performed by the system of FIG. 1.

FIG. 3 depicts a flow chart illustrating a second example method 300 for location verification and enforcement. This method 300 may be performed by the system 100 of FIG. 1.

At operation 310, an electronic device (such as the location verification system device 101 of FIG. 1) may receive location information. The electronic device may receive location information for both a content access device and a gateway device, such as the content access device 103 and the gateway device 102 of FIG. 1. The location information for the gateway device may be determined by the gateway device using multiple communication networks. The electronic device may receive location information for the content access device from the content access device and/or one or more intermediate devices. The electronic device may receive the location for the gateway device from the gateway device and/or one or more intermediate devices.

At operation 320, the electronic device may determine whether or not the location of the content access device and the gateway device match. If not, the flow may proceed to operation 330 where the electronic device may determine that an error has occurred. In some examples, the electronic device may determine that someone is unsuccessfully attempting to spoof that the content access device and the gateway device are at the same location. In various implementations, the electronic device may provide instructions to ensure the content access device and the gateway device are at a same location and reattempt creation of a location record for the content access device. Otherwise, the flow may proceed to operation 340.

At operation 340, after the electronic device determines that the locations of the content access device and the gateway device match, the electronic device may create a record. The record may indicate that the content access device and the gateway device were both present at a location. In some examples, the record my function as a "birth certificate" for the content access device, or a registration for the content access device that enables the content access device to access content associated with the location.

The flow may then proceed to operation 350 where the electronic device may determine whether or not an authorization request is received. The electronic device may receive the authorization request from the content access device as part of the content access device requesting to access content. The authorization request may include location information for the content access device, location information received by the content access device from the gateway device upon determining to access the content, and so on. If so, the flow may proceed to operation 360. Otherwise, the flow may return to operation 350 where the electronic device may again determine whether or not an authorization request is received.

At operation 360, after the electronic device determines that an authorization request is received, the electronic device may compare location information included in and/or associated with the authorization request to the record. If there is a match at operation 370, the flow may proceed to operation 390 and the electronic device may transmit an authorization. Otherwise, the flow may proceed to 380 and the electronic device may deny the authorization request.

In various examples, this example method 300 may be implemented as a group of interrelated software modules or components that perform various functions discussed herein. These software modules or components may be executed within a cloud network and/or by one or more computing devices, such as the location verification system device 101 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as both creating a record and handling an authorization request associated with the record. However, it is understood that this is an example. In various implementations, one or more of these operations may be performed and/or omitted. Various configurations are possible and contemplated without departing from the scope of the present disclosure.

Figure 4:
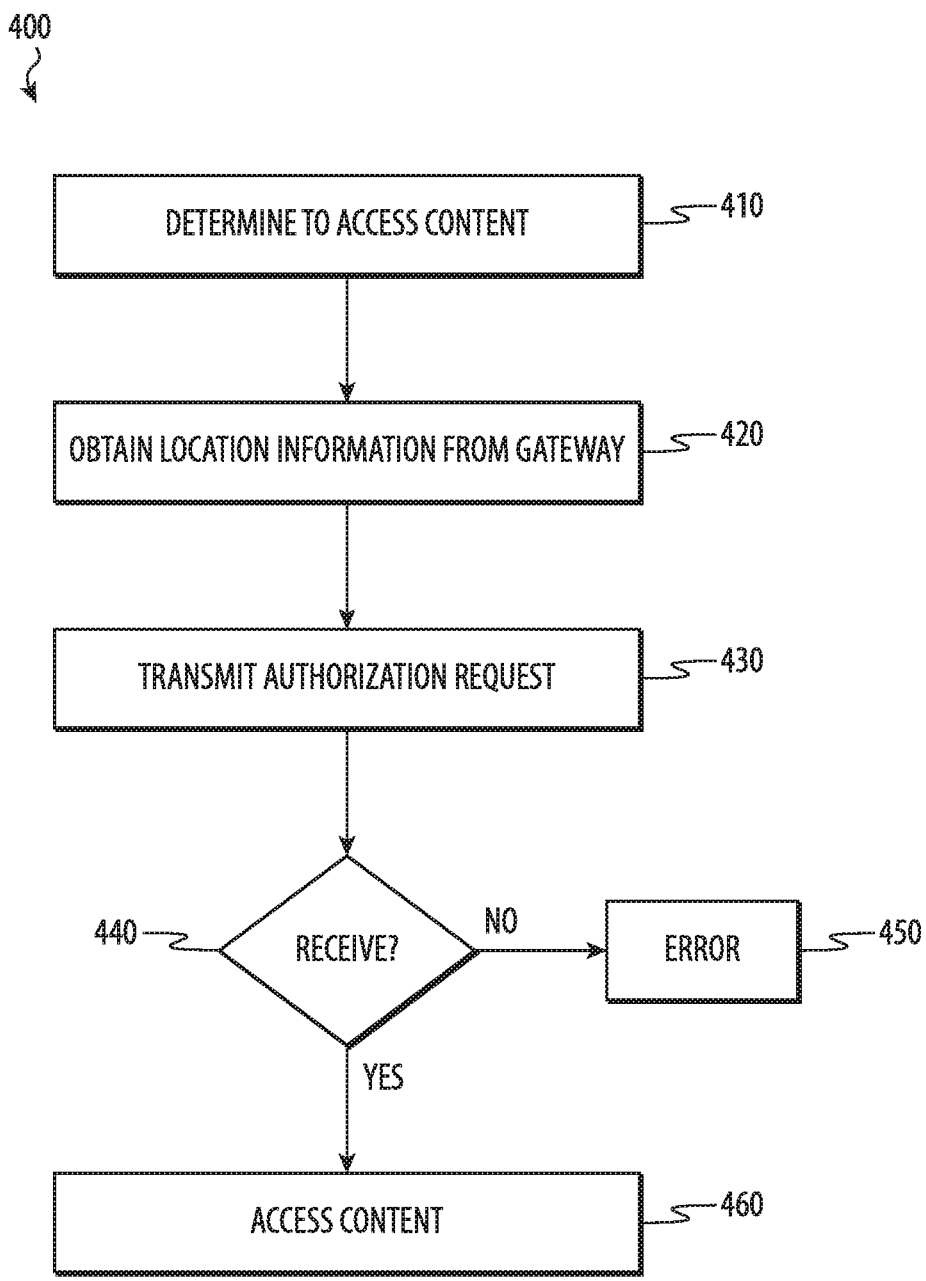
FIG. 4 depicts a flow chart illustrating a third example method for location verification and enforcement. This method may be performed by the system of FIG. 1.

FIG. 4 depicts a flow chart illustrating a third example method 400 for location verification and enforcement. This method 400 may be performed by the system 100 of FIG. 1.

At operation 410, an electronic device (such as the content access device of FIG. 1) may determine to access content. For example, the electronic device may determine to access the content in response to receiving user input, triggering of one or more content recording schedule conditions, and so on. The flow may proceed to operation 420 where the electronic device may obtain location information from a gateway device. The electronic device may communicate with the gateway device over a local area network (such as a WiFi network) to obtain the location information.

At operation 430, the electronic device may transmit an authorization request. The electronic device may transmit the authorization request to a location verification system device, such as the location verification system device 101 of FIG. 1. The electronic device may transmit the authorization request over a different network than the one the electronic device used to communicate with the gateway device. The authorization request may include the location information for the gateway device, location information for the electronic device, and so on.

At operation 440, the electronic device may determine whether or not authorization is received. The electronic device may receive the authorization directly and/or indirectly from the location verification system device. If not, the flow may proceed to operation 450 where the electronic device may determine that an error has occurred. Otherwise, the flow may proceed to operation 460 where the electronic device may access the content.

In various examples, this example method 400 may be implemented as a group of interrelated software modules or components that perform various functions discussed herein. These software modules or components may be executed within a cloud network and/or by one or more computing devices, such as the content access device of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as determining an error has occurred if an authorization is not received. However, in various implementations, the electronic device may retransmit the authorization request if an authorization is not received. For example, the electronic device may transmit an authorization request and then retransmit after a period of time (such as thirty seconds, one minute, and so on) elapses without receipt of the authorization. Various configurations are possible and contemplated without departing from the scope of the present disclosure.

Figure 5:
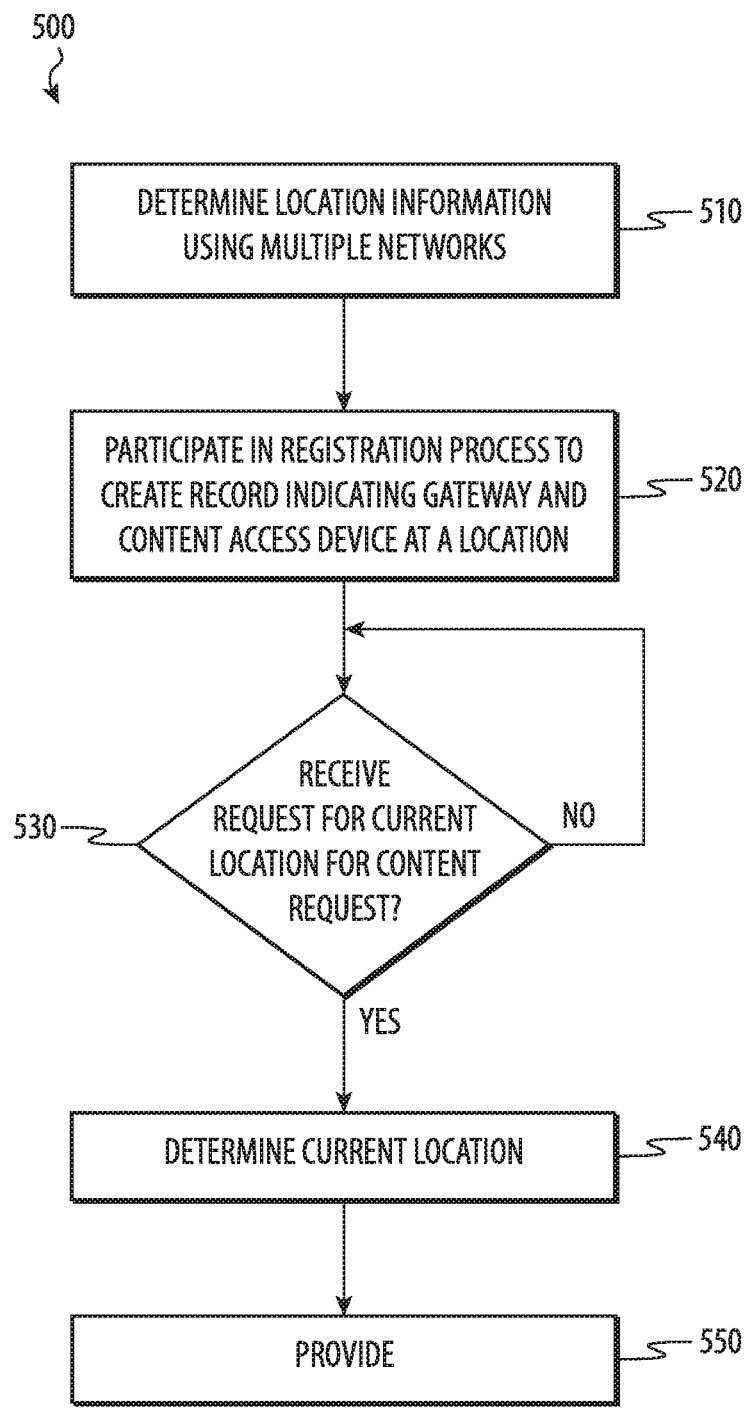
FIG. 5 depicts a flow chart fifth example method for location verification and enforcement. This method may be performed by the system of FIG. 1.

FIG. 5 depicts a flow chart illustrating a fifth example method 500 for location verification and enforcement. This method 500 may be performed by the system 100 of FIG. 1.

At operation 510, an electronic device (such as the gateway device 102 of FIG. 1) may determine its location using multiple communication networks. For example, the electronic device may determine its location using internet protocol location information obtained via an internet, cellular location information obtained via a cellular network, global positioning information obtained via a global positioning system, and so on. By using the multiple networks, the electronic device may increase accuracy and trustworthiness of the location determination while reducing any possibility of error, fraud, spoofing, and so on.

At operation 520, the electronic device may participate in a registration process to create a record indicating that the electronic device, which may be a gateway device, and a content access device are both present at a location. The record may also indicate that the electronic device and the content access device are both connected to a local area network.

At operation 530, the electronic device may determine whether or not a request for a current location of the electronic device is received. The request may be associated with an authorization request to access content and/or other content request submitted by a content access device. If not, the flow may return to operation 530 where the electronic device may again determine whether or not the request is received. Otherwise, the flow may proceed to operation 540.

At operation 540, after the electronic device determines that a request for a current location of the electronic device is received, the electronic device may determine the current location. The electronic device may determine the current location using multiple communication networks. For example, the electronic device may determine the current location using internet protocol location information obtained via an internet, cellular location information obtained via a cellular network, global positioning information obtained via a global positioning system, and so on.

The flow may then proceed to operation 550 where the electronic device may provide the current location. The electronic device may provide the current location directly and/or indirectly to the content access device, to a location verification system device, and so on.

In various examples, this example method 500 may be implemented as a group of interrelated software modules or components that perform various functions discussed herein. These software modules or components may be executed within a cloud network and/or by one or more computing devices, such as the gateway device 102 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as the record indicating that the electronic device and the content access device are located at the same location because they are connected to a local area network. However, in other implementations, a local area network may be omitted and the electronic device and the content access device may communicate directly without a network using a communication technology that indicates proximity, such as near-field communication. Various configurations are possible and contemplated without departing from the scope of the present disclosure.

By way of another example, the method 500 is illustrated and described as the electronic device both participating in a registration process and a process for verifying location for content authorization. However, it is understood that this is an example. In various implementations, one or more of these operations may be performed and/or omitted. Various configurations are possible and contemplated without departing from the scope of the present disclosure.

Figure 6:
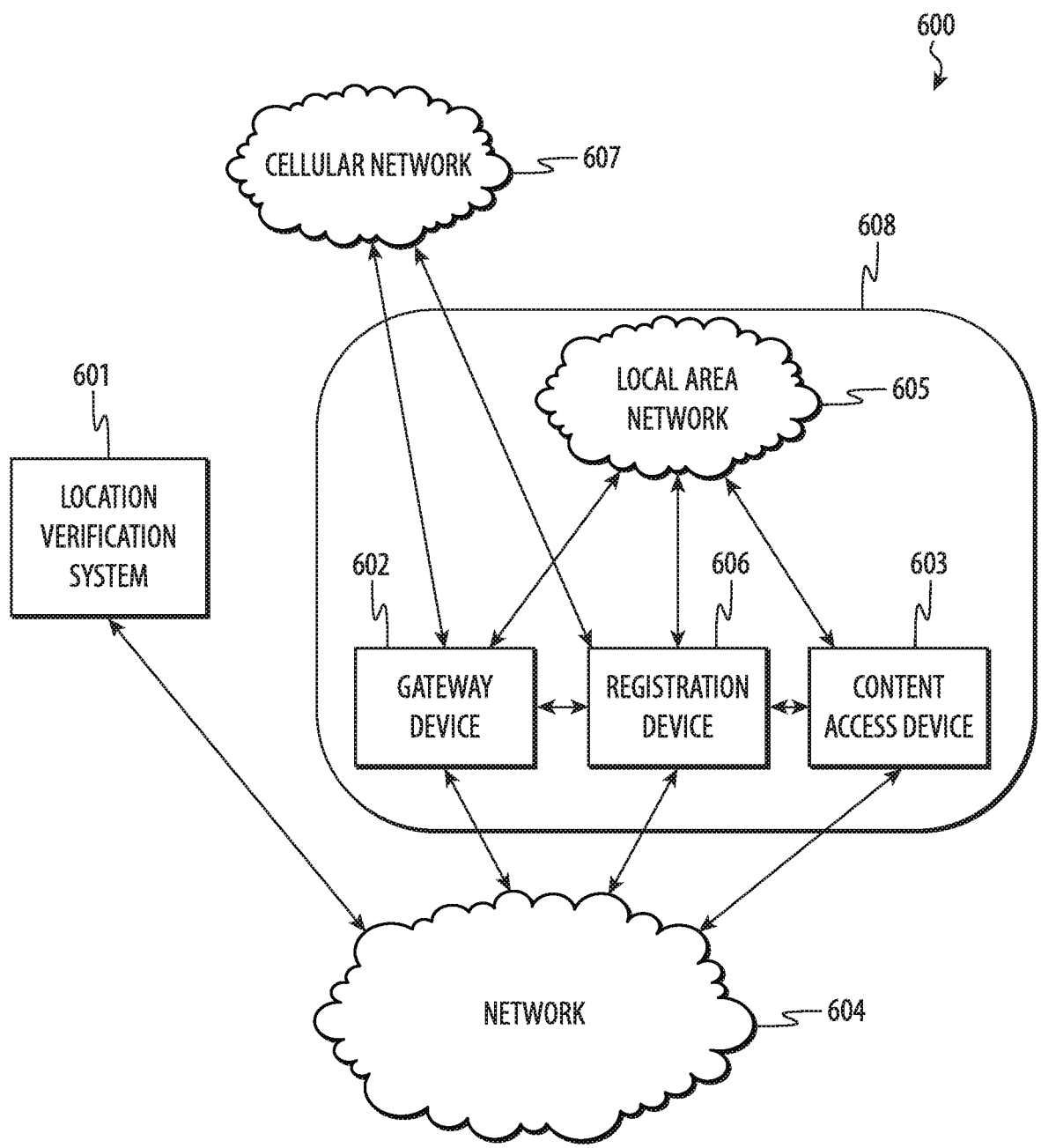
FIG. 6 depicts a second example system for location verification and enforcement.

FIG. 6 depicts a second example system 600 for location verification and enforcement. The system 600 may include a gateway device 602 and a content access device 603 that are present at a location 608 and operable to communicate with each other via a local area network 605 (such as a WiFi network). The system 600 may also include a registration device 606 (such as a cellular telephone, a smart phone, or other cellular enable device) that may be operative to perform a registration process for creating a registration record with a location verification system 601 for the content access device 603 via a network 604.

The registration device 606 may be operative to communicate with the gateway device 602 and/or the content access device 603 via the local area network 605 and/or one or more short range communication technologies, such as Bluetooth, BluetoothLE, near-field communication, and so on. Such a short range communication technology may have a range of approximately a few feet (such as 3, 15, and so on), evidencing even more than the ability to connect to the local area network 605 that the devices are proximately located at the location 608. The registration device 606 and the gateway device 602 may also both be able to connect to the same cellular network 607, thus being able to both obtain corresponding cellular location information that may be compared.

In some examples, the gateway device 602 and/or the registration device 606 may be operative to connect to the cellular network 607 via Narrowband Internet of Things, or NB-IoT. However, in other examples, other connections may be used without departing from the scope of the present disclosure.

The registration device 606 may communicate with the gateway device 602 and the content access device 603 to obtain location information determined using multiple communication networks 604, 607 for one or more of the gateway device 602, the registration device 606, and/or the content access device 603. The registration device 606 (and/or the gateway device 602 and/or the content access device 603) may be operative to communicate this location information to the location verification system 601 via the network 604 as part of the registration process.

The location verification system 601 may receive this location information. Upon verifying that all of the location information matches and/or substantially matches (i.e., is within the location 608), the location verification system 601 may create a record for the content access device 603 indicating that the gateway device 602 and the content access device 603 were both present at the location 608 and connected to the local area network 605.

Subsequently, regardless whether or not the registration device 606 remains at the location 608, the location verification system 601 may receive an authorization request from the content access device 603. The authorization request may include and/or be associated with a current location of the content access device 603 and/or the current location of the gateway device 602 (which may be obtained and provided by the content access device 603). The location verification system 601 may determine whether or not the current locations match and/or substantially match and/or if the current location matches and/or substantially matches the record. If so, the location verification system 601 may allow authorization.

In various implementations, the location verification system 601 may be a cloud based service that may maintain a database of location information with relation to an account identifier (content access account identifier). The location verification system 601 may verify location validation and/or authorization requests from a service provider application running on the content access device 603 and confirms or denies that location check according to information received from the content access device 603. The location verification system 601 may have parameters that a service provider may change to geo-fence the content access device 603 to the record.

The service provider application running on the content access device 603 may create a session with the location verification system 601 to request content. The location verification system 601 may verify user information collected against the account associated with a user.

The link between the service provider application running on the content access device 603 and the location verification system 601 may be encrypted. The encryption may be of a variety of types, and may include a tunneling protocol like https, tls, and so on. Each session may be cross checked with account information applicable to the account identifier managed by the service provider.

The location verification system 601 may maintain a database of devices that are associated with the account identifier. The service provider application running on the content access device 603 may relate all the platform information for the session including the media access control address, serial number, firmware, and soon. This may enable the location verification system 601 to validate that the respective devices are visible to each other on the local area network 605.

The location verification system 601 may communicate with the gateway device 602 to take inventory of all connected devices that may be running the service provider application that are accessible to the gateway device 602 on the local area network 605. The location verification system 601 may then cross validate the inventory against the device accounting as well as validate that the devices are visible to the gateway device 602. This may provide another check against the location of the devices in the location 608.

Figure 7:
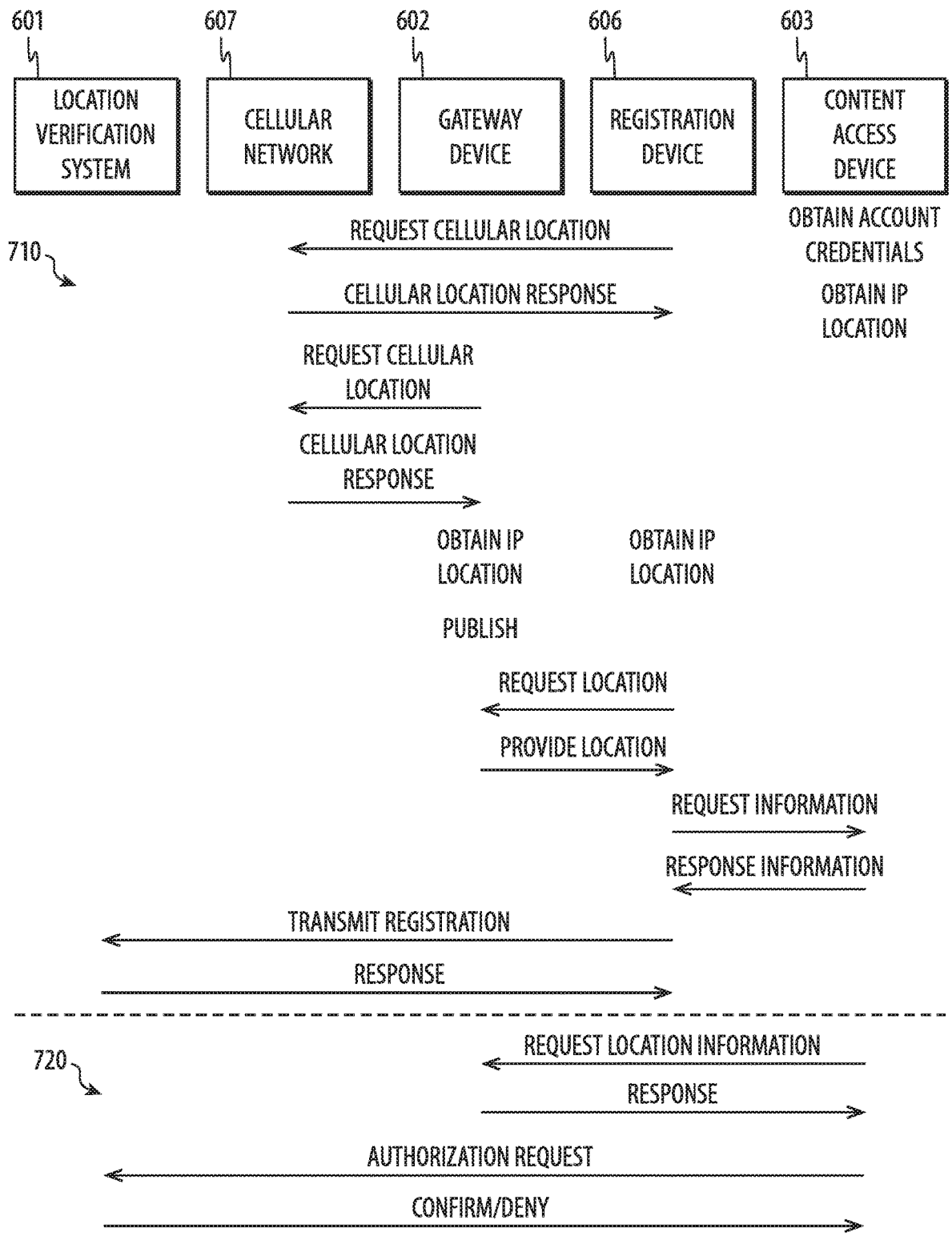
FIG. 7 depicts a flow of operations that may be performed by the components of the system of FIG. 6 when performing one or more processes for location verification and enforcement.

FIG. 7 depicts a flow of operations that may be performed by the components of the system 600 of FIG. 6 when performing one or more processes 710, 720 for location verification and enforcement. Process 710 may be a registration process. Process 720 may be an authorization process.

In process 710, the content access device 603 may obtain an account credential (such as a content access account identifier) for an account with a content provider associated with the location verification system 601. For example, a service provider application running on the content access device 603 may prompt a user for account credentials (such as a content access account identifier) for accessing content upon boot up. The content access device 603 may also obtain its internet protocol location (internet protocol location information for the content access device 603). The registration device 606 may request its cellular location from the cellular network 607 and receive a cellular location response (cellular location information for the registration device 606). Similarly, the gateway device 602 may request its cellular location from the cellular network 607 and receive a cellular location response (cellular location information for the gateway device 602). The registration device 606 and the gateway device 602 may also obtain their internet protocol locations (internet protocol location information for the registration device 606 and the gateway device 602). The gateway device 602 may obtain its location information on boot up. The gateway device 602 may also refresh its location information at various times, such as every five minutes and after reboot or power cycle. The gateway device 602 may publish its location information and/or the availability of its location information, such as via the short range communication technology, which may involve technologies such as Universal Plug and Play or UPnP, BluetoothLE Generic Attribute Profile or "GATT" services, and so on. These technologies may not be capable of traversing a router from a local network to an internet. As such, use of these services may ensure that the devices are on the same local area network. The registration device 606 may thus discover the gateway device 602, request location information from the gateway device 602, and receive the requested location information. The registration device 606 may also request and receive account credentials (such as a content access account identifier) and location information from the content access device 603. The registration device 606 may provide all of this information to the location verification system 601, which may use the received information to create a record and provide a response to the registration device 606.

In process 720, the content access device 603 may request and receive current location information from the gateway device 602. The content access device 603 may submit to the location verification system 601 an authorization request including and/or associated with the current location information and may access content depending on whether the content access device 603 receives a confirmation, a denial, and so on from the location verification system in response.

Although FIG. 7 illustrates specific processes 710 and 720, it is understood that these are examples. In other implementations, various configurations of the same, similar, and/or different operations may be used without departing from the scope of the present disclosure.

Figure 8:
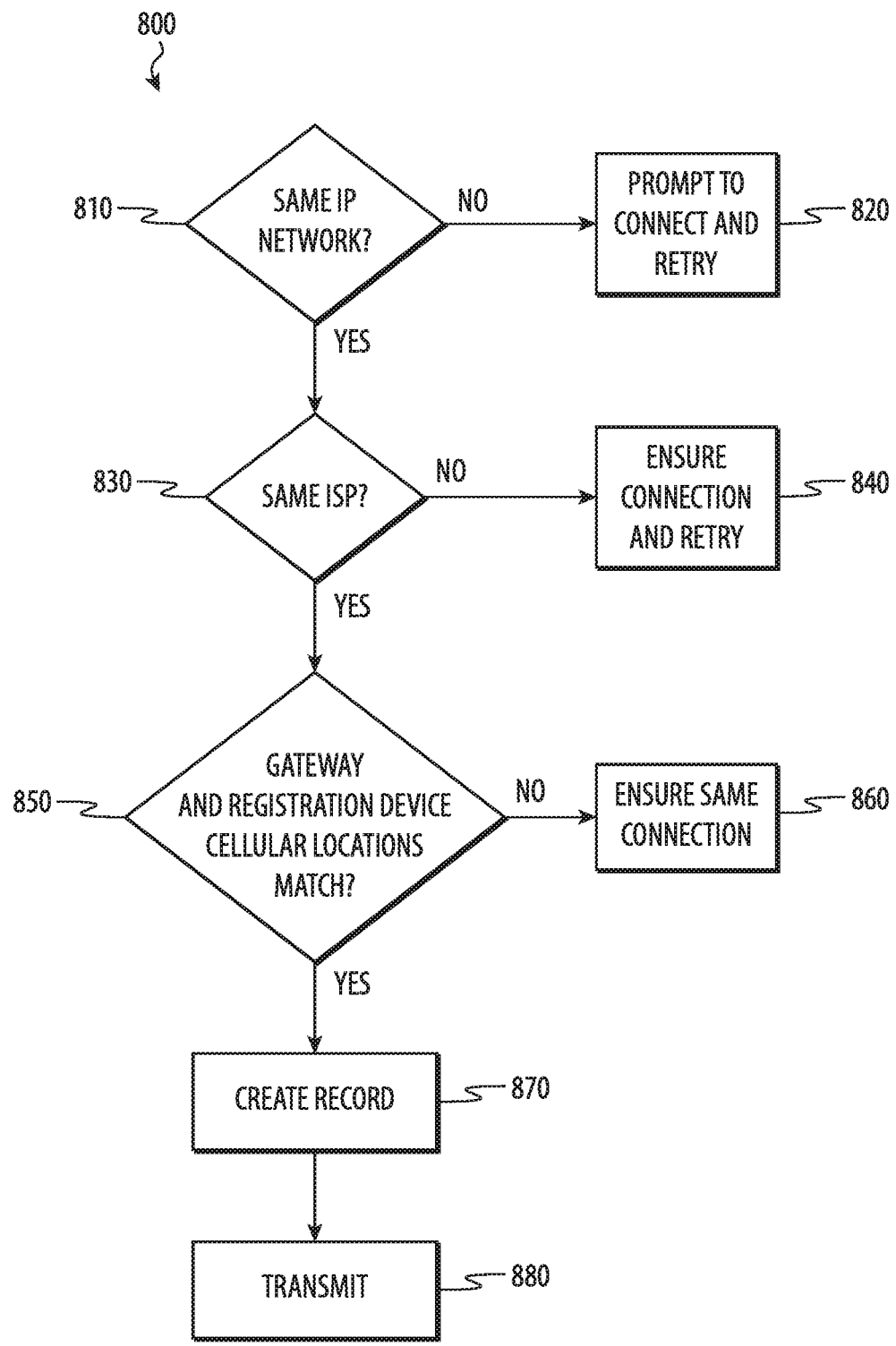
FIG. 8 depicts a flow chart sixth example method for location verification and enforcement. This method may be performed by the systems of FIGS. 1 and/or 6.

FIG. 8 depicts a flow chart illustrating a sixth example method 800 for location verification and enforcement. This method 800 may be performed by the systems 100, 600 of FIGS. 1 and/or 6.

At operation 810, an electronic device (such as the registration device 606 of FIG. 6) may determine whether or not the electronic device, a gateway device (such as the gateway device 602 of FIG. 6), and a content access device (such as the content access device 603 of FIG. 6) are all on the same internet protocol network. If not, the flow may proceed to operation 802 where the electronic device may prompt to connect one or more of the devices and retry. Otherwise, the flow may proceed to operation 830.

At operation 830, after the electronic device determines that the devices are all on the same internet protocol network, the electronic device may determine whether or not the electronic device, the gateway device, and the content access device are all connected via the same internet service provider. If not, the flow may proceed to operation 840 where the electronic device may prompt to ensure connection and retry. Otherwise, the flow may proceed to operation 850.

At 850, after the electronic device determines that the devices are all connected via the same internet service provider, the electronic device may determine whether or not the electronic device and gateway device have matching cellular locations. If not, the flow may proceed to operation 860 where the electronic device may prompt to ensure connection to the same cellular network and retry. Otherwise, the flow may proceed to operation 870.

At 870, the electronic device may create a record or "location birth certificate" for the content access device. The record may indicate that the content access device and gateway device were both present at a location and/or connected to the same local area network. The flow may then proceed to 880 where the record may be transmitted to a location verification system for storage, verification of location for content authorization, and so on.

In various examples, this example method 800 may be implemented as a group of interrelated software modules or components that perform various functions discussed herein. These software modules or components may be executed within a cloud network and/or by one or more computing devices, such as the registration device 606 of FIG. 6.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as determining matching internet protocol locations, internet service providers, and matching cellular locations. However, it is understood that this is an example. In other implementations, other approaches may be used. By way of example, location information including zip code, internet service provider, internet protocol address, city, state, and so on may be examined from geolocation information obtained via a hypertext transfer protocol (HTTP) request submitted to 'http://ipinfo.io/json' and/or LTE (Long-Term Evolution)/cellular tower location information.

By way of another example, the method 800 is illustrated and described as creating the record and transmitting the record to the location verification system. However, it is understood that this is an example. In various implementations, the method 800 may be performed by the location verification system using information received from a registration device. In such implementations, the location verification system may create and store the record rather than receiving the created record.

Figure 9:
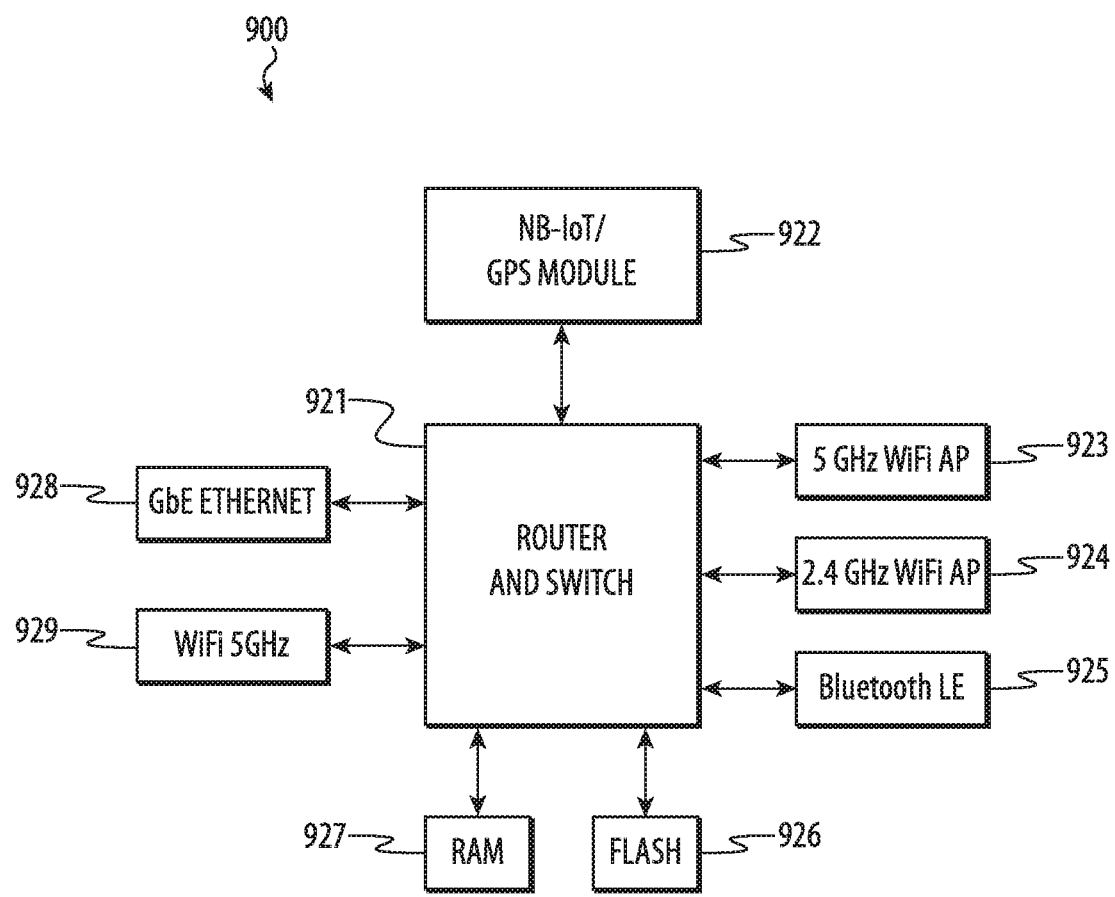
FIG. 9 depicts an example hardware architecture that may be used to implement the gateway device of FIGS. 1 and/or 6.

FIG. 9 depicts an example hardware architecture 900 that may be used to implement the gateway device 102, 602 of FIGS. 1 and/or 6. In this example, the architecture 900 may include a router and switch 921, a NB-IoT/GPS module 922, a Gigabit Ethernet 928 wide area network interface, a WiFi 5 GHz 929 wide area network interface, a 5 GHz WiFi AP 923 radio, a 2.4 GHZ WiFi AP 924 radio, a BluetoothLE 925 interface, random access memory 927 and/or another storage medium, flash 926 and/or another storage medium, and so on.

The 5 GHz WiFi AP 923 and the 2.4 GHZ WiFi AP 924 radios may be operative to extend a WiFi network, though any WiFi radios may be used without departing from the scope of the present disclosure. The NB-IoT/GPS module 922 may enable collection of LTE collection information from an LTE network and publish such on a WiFi or other local area network.

Although specific components are illustrated and described in the context of the architecture 900, it is understood that this is an example. Other arrangements of the same, similar, and/or different components may be used in other implementations. Various configurations are possible and contemplated without departing from the scope of the present disclosure.

In various implementations, a method for location verification and enforcement may include receiving an authorization request to access content from a content access device, the authorization request including location information received by the content access device from a gateway device that is connected to the content access device by a local area network, the location information determined by the gateway device using multiple communication networks; comparing the location information to a record for the content access device indicating that the content access device and the gateway device were both present at a location; and when the location information matches the record, transmitting an authorization to the content access device.

In some examples, the method may further include creating the record using data received from a registration device that communicates with the content access device and the gateway device and storing the record. In a number of such examples, the data received from the registration device may include first internet protocol location information received from the gateway device, second internet protocol location information received from the content access device, third internet protocol location information of the registration device, first cellular network location information received from the gateway device, and second cellular network location information of the registration device. In some such examples, the method may further include determining a match between the first internet protocol location information, the second internet protocol location information, the third internet protocol location information, the first cellular network location information, and the second cellular network location information.

In various examples, the method may further include creating the record using received data indicating first internet protocol location information of the gateway device, second internet protocol location information of the content access device, and cellular network location information of the gateway device; determining a match between the first internet protocol location information, the second internet protocol location information, and the cellular network location information; and storing the record. In some such examples, the location information may include a current internet protocol location of the gateway device and a current cellular network location of the gateway device. In a number of such examples, the method may further include matching the location information to the record by matching the first internet protocol location to the current internet protocol location and the cellular network location information to the current cellular network location.

In some implementations, a content access device may include a non-transitory storage medium that stores instructions and a processing unit. The processing unit may execute the instructions to determine to access content; obtain location information from a gateway device on a local area network, the location information determined by the gateway device using multiple communication networks; transmit an authorization request to access content to a location verification system, the authorization request including the location information; when the location information matches a record for the content access device stored by the location verification system indicating that the content access device and the gateway device were both present at a location, receive an authorization from the location verification system; and access the content.

In various examples, the processing unit may determine internet protocol location information for the content access device. In some examples, the processing unit may provide the internet protocol location information for the content access device with the authorization request.

In a number of examples, the processing unit may participate in a registration process to create the record where the internet protocol location information for the content access device is provided to the location verification system along with gateway device internet protocol location information and gateway device cellular network location information. In some such examples, the processing unit may participate in the registration process by providing the internet protocol location to a registration device that communicates with the location verification system.

In various examples, the processing unit may provide a content access account identifier with the authorization request. In some such examples, the record may include the content access account identifier.

In a number of implementations, a gateway device for location verification and enforcement may include a first communication unit, a second communication unit, a non-transitory storage medium that stores instructions, and a processing unit. The processing unit may execute the instructions to determine location information for the gateway device using multiple communication networks, the first communication unit, and the second communication unit; and participate in a registration process to create a record with a location verification system by providing the location information, the record indicating the gateway device and a content access device are connected by a local area network and are present in a location.

In some examples, the processing unit may receive a request for a current location of the gateway device from the content access device as part of the content access device requesting to access content; determine the current location using the multiple communication networks, the first communication unit, and the second communication unit; and provide the current location to the content access device. In various examples, the processing unit may participate in the registration process by providing the location information to a registration device that communicates with the location verification system and the content access device. In a number of such examples, the processing unit may communicate with the registration device using Bluetooth, Bluetooth low energy, or near-field communication.

In various examples, the location information may include at least two of internet protocol location information for the gateway device, cellular network location information for the gateway device, and global positioning system location information for the gateway device. In a number of examples, the first communication unit may be a Narrowband Internet of Things communication unit.

As described above, various devices may determine internet protocol location information related to their location. Devices connected via internet protocol may obtain this internet protocol location information by sending an HTTP request to 'http://ipinfo.io/json'. This request may return a number of different items of information that may be used to determine location of the device. This may include the internet protocol address (such as a local area network internet protocol address), the city of the terminating structure in the internet service provider, the state of the internet service provider connection, the country of the internet service provider connection, global positioning system coordinates of the internet service provider connection, the zip code of the connecting internet service provider, the area code of the connecting internet service provider, the name of the connecting internet service provider, and so on. For example, the above may return: "ip": "255.233.215.130", "city": "Denver", "region": "Colorado", "country": "US", "loc": "40.7400,-100.9990", "postal": "80202", "phone": "303", "org": "AS209 InternetServiceProvderCO, LLC". By way of another example, the above may return: "ip": "255.29.176.52", "hostname": "inetp-ohn-po103.provider.com", "city": "Jackson Heights", "region": "New York", "country": "US", "loc": "41.7944,-74.9905", "postal": "11202", "org": "AS22140 Provider USA, INC.". In yet another example, the above may return: "IP": "255.25.60.45", "Region": "Colorado", "Country": "US", "City": "Longmont", "Org": "AS7922 Provider Communications, LLC".

However, it is understood that these are examples and that other configurations are possible and contemplated without departing from the scope of the present disclosure.

In some situations, the information returned may not be completely representative of the internet service provider. For example, a WISP (Wireless Internet Service Provider) may be tunneled to a Point of Presence (PoP) and may return this information instead. Virtual Private Networks (VPNs) may also return information about the internet service provider. By way of illustration, a work laptop used in the home with a VPN enabled may return information from the work internet service provider instead of one connected to the home.

As described above, various devices may determine cellular location information related to their location. Devices connected to a cellular network may obtain various items of connectivity information from one or more cellular towers of the cellular network. This may include a Base stations Area Code (TAC), Base station tracking area identifier (TAI), Public Land Mobile Network identifier (PLMN-ID), Mobile Country Code (MCC), Mobile Network Code (MNC), Evolved-UMTS (Universal Mobile Telecommunications System) Terrestrial Radio Access Network (E-UTRAN) Cell Identifier (ECI), E-UTRAN Cell Global identifier (ECGI), and so on.

As described above, a record may be created for a content access device indicating that the content access device and a gateway device were both present at a location and/or connected to a local area network. In some examples, this record may be a location birth certificate that gets associated with a customer's account after the first location binding effort by the customer. The location birth certificate may be sent as a standard XML (extensible markup language) formatted message and may be encrypted by a content provider to secure the validity of location information. This may include an "Account ID" field that corresponds to a content provider customer account ID, a "LAN IP SUBNET" field that corresponds to a LAN IP Subnet of the content access device obtained using internet protocol location information, a "City" field that corresponds to a city from the internet protocol location information, a "Region" field corresponding to a region from the internet protocol location information, a "Country" field corresponding to a country from the internet protocol location information, an "Org" field corresponding to the organization and/or internet service provider from the internet protocol location information, an "LTE TAC" field corresponding to LTE TAC information received from a gateway, an "LTE TAI" field corresponding to LTE TAI information received from the gateway, an "LTE PLMN-ID" field corresponding to LTE PLMN-ID information received from the gateway, an "LTE MCC" field corresponding to LTE MCC information received from the gateway, an "LTE MNC" field corresponding to LTE MNC information received from the gateway, an "LTE ECI" field corresponding to LTE ECI information received from the gateway, an "LTE ECGI" field corresponding to LTE ECGI information received from the gateway, a "GPS" field corresponding to an LTE global positioning system location received from the gateway, and so on.

As described above, a gateway device may use UPnP to publish location information and/or the availability of such on a local area network. The following is an example of XML UPnP Service data that an Application UPnP Server may advertise (content between "root" tags may be encrypted by the service operator): <?xml' version="1.0" encoding="utf-8"?><root xmlns="urn:shcemas-upnp-org:device-1-0"><specVersion><major>1</major><minor>0</minor></specVersion><providerapp><providerappname>appname,/providerappname><appversion>v.1.0xxx</appversion><platform>Android/iOS/Roku</platform><model>XC2-ADF</model?<hwversion>1.1</hwversion><swversion>1.1</swversion><mac>00112233</mac><serialnumber>123456789-CD</serialnumber></providerapp></root?.

As described above, a gateway device may publish a Bluetooth GATT service over a BluetoothLE interface. Here is an example definition for such a Bluetooth GATT service: <?xml version="1.0" encoding="utf-8"?><configuration><service uuid="1800"><description>Generic Access Profile</description><characteristic uuid="2a00"><properties read="true" const="true/><value>gateway</value></characteristic><characteristic uuid="2a01"><properties read="true" const="true"/><value type="hex">012345678</value></characteristic></service><service uuid=" content provider provided UUID" advertise="true"> <description>gateway internet protocol location information</description><characteristic uuid="content provider provided" id="xgatt_data"><description>IPaddress</description><properties read="true" indicate="true"/> <value variable_length="true" length="20" type="user"/></characteristics><characteristic uuid="content provider provided" id="xgatt_data"><description>City </description><properties read="true" indicate="true"/><value variable_length="true" length="20" type="user"/></characteristics><characteristic uuid="content provider provided" id="xgatt_data"><description>Region</description><properties read="true" indicate="true"/> <value variable_length="true" length="20" type="user"/></characteristics><characteristic uuid="content provider provided" id="xgatt_data"><description>Country</description><properties read="true" indicate="true"/><value variable_length="true" length="20" type="user"/></characteristics><characteristic uuid="content provider provided" id="xgatt_data"><description>GPS</description><properties read="true" indicate="true"/><value variable_length="true" length="20" type="user"/></characteristics><characteristic uuid="content provider provided" id="xgatt_data"><description>Postal</description><properties read="true" indicate="true"/><value variable_length="true" length="20" type="user"/></characteristics><characteristic uuid="content provider provided" id="xgatt_data"><description>ISP</description><properties read="true" indicate="true"/><value variable_length="true" length="20" type="user"/></characteristics></service><service uuid="content provider provided UUID" advertise="true"><description>gateway cellular tower location information</description><characteristic uuid="content provider provided" id="xgatt_data"><description>TAC</description><properties read="true" indicate="true"/><value variable_length="true" length="20" type="user"/></characteristics><characteristic uuid="content provider provided" id="xgatt_data"><description>TAI</description><properties read="true" indicate="true"/><value variable_length="true" length="20" type="user"/></characteristics><characteristic uuid="content provider provided" id="xgatt_data"><description>PLMNID</description><properties read="true" indicate="true"/><value variable_length="true" length="20" type="user"/></characteristics><characteristic uuid="content provider provided" id="xgatt_data"><description>MCC</description><properties read="true" indicate="true"/><value variable_length="true" length="20" type="user"/></characteristics><characteristic uuid="content provider provided" id="xgatt_data"><description>MNC</description><properties read="true" indicate="true"/><value variable_length="true" length="20" type="user"/></characteristics><characteristic uuid="content provider provided" id="xgatt_data"><description>ECI</description><properties read="true" indicate="true"/><value variable_length="true" length="20" type="user"/></characteristics><characteristic uuid="content provider provided" id="xgatt_data"><description>ECGI</description><properties read="true" indicate="true"/> <value variable_length="true" length="20" type="user"/></characteristics></service></configuration>.

The following is an example of XML UPnP Service data that a gateway UPnP Server may advertise on a local area network (the content between the "root" tags may be encrypted by the service operator): <?xml version="1.0" encoding="utf-8"?><root xmlns="urn:shcemas-upnp-org:device-1-0"><specVersion><major>1</major><minor>0</minor></specVersion><location><ip>255.233.215.130</ip><city>Denver</city><region>Colorado</region><country>US</country><gps>40.7400,-100.9990</gps><postal>80202</postal><isp>AS209 InternetServiceProvderCO, LLC</isp><tac>1234</tac><tai<12345678</tai><plmnid>123456</plmnid><mnc>123</mnc><mcc>123</mcc><eci>1234567</eci><ecgi>1234567890ABC</ecgi></location></root>.

As described above and illustrated in the accompanying figures, the present disclosure relates to location verification and enforcement. An authorization request to access content is received from a content access device that includes location information obtained from a gateway device via a local area network and determined using multiple communication networks. The location information is compared to a record indicating that the content access device and the gateway device were both present at a location. When the location information matches the record, an authorization is transmitted to the content access device.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for location verification and enforcement, comprising:
   receiving an authorization request to access content from a content access device, the authorization request including a specification of the content that is requested and location information received by the content access device from a gateway device that is connected to the content access device by a local area network, the location information determined by the gateway device using multiple communication networks;
   comparing the location information to a record for the content access device indicating that the content access device and the gateway device were both present at a location;
   verifying a content access device location based on each of the multiple communication networks, connection of the content access device and the gateway device by the local area network, and correspondence between the location information and the record;
   upon verifying the content access device location, transmitting an authorization to the content access device;
   creating the record using data received from a registration device that communicates with the content access device and the gateway device wherein the data received from the registration device comprises first internet protocol location information received from the gateway device, second internet protocol location information received from the content access device, third internet protocol location information of the registration device, first cellular network location information received from the gateway device, and second cellular network location information of the registration device;
   determining a match between the first internet protocol location information, the second internet protocol location information, the third internet protocol location information, the first cellular network location information, and the second cellular network location information; and
   storing the record.

2. The method of claim 1, wherein the data is received from the registration device when the registration device is performing a registration process involving the content access device.

3. The method of claim 1, wherein the data is received from the registration device when the registration device is performing a registration process involving the gateway device.

4. The method of claim 1, wherein the registration device comprises a cellular telephone.

5. The method of claim 1, wherein the registration device comprises a mobile computing device.

6. The method of claim 1, wherein the authorization request includes a content access account identifier.

7. The method of claim 6, wherein the record includes the content access account identifier.

8. A content access device, comprising:
   a non-transitory storage medium that stores instructions; and
   a processor that executes the instructions to:
   determine to access content;
   obtain location information from a gateway device on a local area network, the location information determined by the gateway device using multiple communication networks;
   transmit an authorization request to access the content to a location verification system, the authorization request including a specification of the content that is requested and the location information;

when the location verification system verifies a content access device location based on each of the multiple communication networks, connection of the content access device and the gateway device by the local area network, and correspondence between the location information and a record for the content access device stored by the location verification system indicating that the content access device and the gateway device were both present at a location, receive an authorization from the location verification system; and access the content; wherein:

the record is created using data received from a registration device that communicates with the content access device and the gateway device;

the data received from the registration device comprises first internet protocol location information received from the gateway device, second internet protocol location information received from the content access device, third internet protocol location information of the registration device, first cellular network location information received from the gateway device, and second cellular network location information of the registration device; and the first internet protocol location information, the second internet protocol location information, the third internet protocol location information, the first cellular network location information, and the second cellular network location information match.

9. The content access device of claim 8, wherein the processor determines internet protocol location information for the content access device.

10. The content access device of claim 9, wherein the processor provides the internet protocol location information for the content access device with the authorization request.

11. The content access device of claim 10, wherein the processor participates in a registration process to create the record.

12. The content access device of claim 11, wherein the processor participates in the registration process by providing the internet protocol location information to the registration device that communicates with the location verification system.

13. The content access device of claim 8, wherein the processor provides a content access account identifier with the authorization request.

14. The content access device of claim 13, wherein the record includes the content access account identifier.

15. A location verification system, comprising:

a non-transitory storage medium that stores instructions; and a processor that executes the instructions to:

receive content access device location information for a content access device and gateway device location information for a gateway device, the gateway device location information determined using multiple communication networks;

create a record using the content access device location information and the gateway device location information upon determining that the content access device and the gateway device are present in a location;

receive an authorization request to access content from the content access device, the authorization request including a specification of the content that is requested and current gateway device location information obtained from the gateway device by the content access device using a local area network;

verify a content access device location based on each of the multiple communication networks, connection of the content access device and the gateway device by the local area network, and correspondence between the current gateway device location information and the record; and allow the authorization request upon verifying the content access device location; wherein:

the record is created using data received from a registration device that communicates with the content access device and the gateway device;

the data received from the registration device comprises first internet protocol location information received from the gateway device, second internet protocol location information received from the content access device, third internet protocol location information of the registration device, first cellular network location information received from the gateway device, and second cellular network location information of the registration device; and the first internet protocol location information, the second internet protocol location information, the third internet protocol location information, the first cellular network location information, and the second cellular network location information match.

16. The system of claim 15, wherein the registration device communicates with the content access device and the gateway device using at least the local area network.

17. The system of claim 16, wherein the registration device communicates with the content access device using at least one of Bluetooth, BluetoothLE, or near-field communication.

18. The system of claim 16, wherein the registration device communicates with the gateway device using at least one of Bluetooth, BluetoothLE, or near-field communication.

19. The system of claim 15, wherein the gateway device location information includes at least two of:

internet protocol location information for the gateway device;

cellular network location information for the gateway device; and global positioning system location information for the gateway device.

20. The system of claim 15, wherein the processor denies the authorization request upon determining that the current gateway device location information does not match the record.

* * * * *